United States Patent [19]

Spreckelmeyer

[11] 3,907,978

[45] Sept. 23, 1975

[54] PRODUCTION OF SYNTHETIC FLUORSPAR

[75] Inventor: Bernhard Spreckelmeyer, Leverkusen, Germany

[73] Assignee: Bayer Aktiengesellschaft, Leverkusen, Germany

[22] Filed: Feb. 11, 1974

[21] Appl. No.: 441,546

[30] Foreign Application Priority Data

Feb. 17, 1973 Germany............................ 2307897

[52] U.S. Cl. ................. 423/490; 423/163; 423/335
[51] Int. Cl.² .................... G01F 11/22; C01B 33/12
[58] Field of Search..................... 423/490, 163, 335

[56] References Cited
UNITED STATES PATENTS

| | | | |
|---|---|---|---|
| 2,780,521 | 2/1957 | Butt.................................. | 423/163 X |
| 2,780,523 | 2/1957 | Gloss............................... | 423/490 X |
| 3,551,332 | 12/1970 | Baumann et al................ | 423/490 X |

*Primary Examiner*—Edward Stern
*Attorney, Agent, or Firm*—Burgess, Dinklage & Sprung

[57] ABSTRACT

In the production of synthetic fluorspar low in $SiO_2$ wherein aqueous hexafluosilicic acid is reacted with calcium carbonate, and the resulting calcium fluoride is filtered off, the improvement which comprises effecting the reaction by adding hexafluosilicic acid to an aqueous suspension of the calcium carbonate at a temperature of about 0° to 40°C, there being present during the reaction at least about 3 times as much water by weight as calcium carbonate. Advantageously the reaction is effected in a plurality of stages, in the first of which the calcium carbonate suspension is reacted with a stoichiometric excess of hexafluosilicic acid up to a pH of about 2 to 3, and after a residence time of about 5 to 30 minutes the pH is adjusted to about 4 to 6 in the second stage by the addition of calcium carbonate.

5 Claims, No Drawings

PRODUCTION OF SYNTHETIC FLUORSPAR

This invention relates to a process for the production of a synthetic fluorspar ($CaF_2$) low in silicon dioxide from hexafluosilicic acid ($H_2SiF_6$) by precipitation in an aqueous calcium carbonate suspension.

The fluorapatite ($Ca_5(PO_4)_3F$) used in the production of phosphoric acid and fertilizers contains approximately 3.2 to 4.2 % of fluorine. At present, around 45 to 50 % of the quantity of fluorine used can be recovered in the form of aqueous $H_2SiF_6$ from the HF— and $SiF_4$— containing gases formed during processing. Hexafluosilicic acid can be used directly (fluoridation of drinking water) or in the form of its salts (for example as $MgSiF_6$ which is used for preserving timber). However, it is only possible in this way to exploit a small proportion of the $H_2SiF_6$ which accumulates.

In order to be able to process $H_2SiF_6$ into the products fluorspar, hydrofluoric acid, aluminum fluoride and cryolite, which are used widely in industry, the silicon has to be separated from the fluorine. In all the processes which have been discussed hitherto, the silicon is absorbed directly or indirectly on oxygen to form $SiO_2$.

One possibility is to subject the $H_2SiF_6$ to ammonolysis:

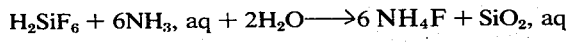

Even today, $AlF_3$ and $Na_3AlF_6$ can be economically produced by known methods through the $NH_4F$-intermediate stage.

Although it is technically possible to convert $NH_4F$ into $CaF_2$ for use either as a metallurgical spar or as an acid spar, the reaction involved is uneconomical. The direct reaction of $H_2SiF_6$ with CaO or $CaCO_3$ to form $CaF_2$ and $SiO_2$ is basically attractive, but unfortunately the separation of $CaF_2$ and $SiO_2$ has hitherto remained a problem although a number of investigations have been made towards finding a solution. For example, it is possible according to U.S. Pat. Nos. 2,780,523 and 2,780,521 to react dilute aqueous $H_2SiF_6$ ($H_2SiF_6$ concentration < 4 and < 6 %, respectively) at temperatures of from 2° to 38°C and at temperatures of from 3° to 55°C, respectively, by introducing finely divided calcium carbonate, to form a $CaF_2$-precipitate more or less poor in $SiO_2$ and colloidally dissolved $SiO_2$. However, under the conditions specified, almost unfilterable precipitates are obtained with the result that it has not yet been possible economically to work these processes.

The present invention relates to a process in which a readily filterable, synthetic fluorspar low in $SiO_2$ is obtained as precipitate by reacting ground calcium carbonate suspended in water with aqueous hexafluosilicic acid at low temperature. The $SiO_2$ formed can be separated off without difficulty, in the form of an aqueous sol, form the $CaF_2$ by filtration. The fluorspar obtained with a purity of 85 to 95 %, an $SiO_2$ content of approximately 1 to 4 % and a $CaCO_3$ content of approximately 3 to 10 % can be used as required both as an acid spar for the production of HF and also in briquetted or granulated form as metallurgical fluorspar.

After suitable concentration, the filtrate can be used as silica sol. The $SiO_2$ can also be flocculated and used as a filler.

The process according to the invention is characterized by the fact that a suspension of calcium carbonate in water is reacted at a temperature of around 0° to 40°C with an aqueous hexafluosilicic acid, the calcium carbonate to water ratio of the suspension being adjusted so that a hypothetical calcium carbonate to overall water ratio of smaller than about 1:3 and preferably smaller than about 1:5 is present, depending upon the concentration of hexafluosilicic acid used, the resulting calcium fluoride precipitate is separated off from the reaction medium and, optionally, washed and dried.

Although $H_2SiF_6$-solution of any concentration can be used as starting material, it is preferred to use solutions containing about 5 to 30 % by weight of $H_2SiF_6$. However, it is essential to adapt the water content of the calcium carbonate suspension to the concentration of the hexafluosilicic acid because the freedom from $SiO_2$ of the calcium fluoride precipitated and its filtration properties are considerably governed by the water content of the reaction medium. At least about 3 and preferably at least about 5 parts by weight of water should be present per part by weight of the calcium carbonate used. Although, in principle, there is no upper limit to the quantity of water, it is best for economical reasons to use about 5 to 15 parts by weight of water.

The filtrates which are obtained have an $SiO_2$-content of about 1 to 3% and a fluorine content of around 0.003%. The $SiO_2$-content of the calcium fluoride separated off is less than about 4% and can be reduced to less than about 2% by using an $SiO_2$-free calcium carbonate.

During the reaction the temperature should be maintained as low as possible. At temperatures above about 40°C, the $SiO_2$ is in danger of flocculating out relatively quickly. Accordingly, the reaction is preferably carried out at a temperature in the range of about 0° to 30°C.

In order to obtain a calcium fluoride as free from carbonate as possible, the reaction is largely carried out using stoichiometric quantities of the reactants. In general, however, a slight excess of $CaCO_3$ is used because the filtrate is required to contain as little fluorine as possible.

In one particular embodiment, the calcium carbonate suspension is initially reacted with an excess of hexafluosilicic acid up to a pH-value of around 2 to 3, after which the pH-value is adjusted to about 4 to 6 by the addition of more calcium carbonate. In another multiple-stage embodiment, it is also possible initially to add a deficit of $H_2SiF_6$.

In order to obtain as pure a synthetic fluorspar as possible with as little fluorine as possible in the effluent, it is also possible to adopt the following procedure:

In a first stage, $CaCO_3$ is reacted with a deficit of $H_2SiF_6$ as already described. After the $CaCO_3$-containing fluorspar has been separated off, the filter cake is treated in a second stage with some of or all the $H_2SiF_6$ required for the first stage. The solids component is then separated off in the form of highly pure fluorspar and washed. The filtrate and washing water are used for the reaction in the first stage of the process. It is also possible, in principle, to use an excess of $H_2SiF_6$ in the first stage and following separation to aftertreat the precipitate in the second stage. However, the first process is preferred by virtue of the better stability of the $SiO_2$-sol formed.

It is assumed that the reaction involved is a topochemical reaction. In order to obtain a product as free from carbonate as possible, it is advisable to employ a residence time of around 5 to 30 minutes in the two-stage reaction before the final pH-value required is adjusted.

The process can be carried out either in batches, for example in ordinary agitation vessels, or continuously, for example in a cascade of such vessels.

No special apparatus are required for carrying out the process.

The conversion reaction, the after reaction and neutralization can be carried out in agitation vessels or in other vessels which allow thorough admixture. The calcium fluoride can be separated off from the reaction medium by means of separators, for example, filters, centrifuges and decanters. The calcium fluoride filter cake can be dried in the drying installations normally used for flotation spar.

The process according to the invention is illustrated by the following Examples.

EXAMPLE 1

273 g of a ground 98% limestone were stirred with 2730 g of water to form a limestone suspension having a solids to water ratio of 1:10. 342 ml of a 28.8% aqueous $H_2SiF_6$ ($d = 1.3$) were then introduced into this suspension with vigorous stirring over a period of 3 minutes at 20°C. After 5 minutes to complete the reaction (after reaction time) 30 g of limestone were added over a period of 2 minutes in the second stage of the reaction to achieve further neutralization (after-neutralization). The pH-value of the suspension rose from 3.8 to 5.0. The $CaF_2$ precipitated could be filtered without difficulty. 410 g of filter cake with a water content of 39% (dried at 100°C) and 3185 g of filtrate were obtained. (Filtration time 60 minutes for a filter surface of 200 cm². ). The filtrate contained approximately 0.003% of F and 1.45% of $SiO_2$. In addition to $CaF_2$ and the excess $CaCO_3$ added, the dried filter cake contained 4% of $SiO_2$.

This result applied to an unwashed filter cake; washing with water reduced the $SiO_2$-content of the dried product to 3% of $SiO_2$.

EXAMPLE 2

300 g of a ground 98% limestone were stirred with 2730 g of water to form a suspension. 342 ml of a 28.8% aqueous $H_2SiF_6$ were added with vigorous stirring over a period of 20 minutes at 20°C. An after reaction time of 20 minutes, during which the pH-value rose from pH 3 to pH 4.5, was followed by filtration. (Filtration time 40 minutes for a filter surface of 200 cm².) The filter cake washed with water contained 85% of $CaF_2$ and 3% of $SiO_2$ after drying at 100°C.

EXAMPLE 3

273 g of limestone were stirred with 905 g of water to form a suspension. 2487 ml of a 5% aqueous $H_2SiF_6$ were added with vigorous stirring over a period of 20 minutes at 15°C. An after reaction time of 5 minutes was followed by after neutralization for 5 minutes with 25 kg of limestone and then by filtration. (Filtration time 20 minutes for a filter surface of 200 cm²). The washed and dried filter cake contained 86% of $CaF_2$.

EXAMPLE 4

1000 g of a hexafluosilicic acid containing calcium silicofluoride, which had been obtained in a previous stage, were added with stirring over a period of 20 minutes at 20°C to a suspension of 246 g of ground 98% limestone in 2730 g of water. Following an after reaction time of 10 minutes, 27 g of powdered limestone were added for after-neutralization, followed after another 10 minutes by filtration. The filtrate contained 20 mg of fluoride per liter. The dry substance of the filter cake consisted of 86% of $CaF_2$, 11% of $CaCO_3$ and 3% of other substances, mainly $SiO_2$.

In a second stage, the moist filter cake was stirred with 445 g of 23.8% hexafluosilicic acid. During a reaction time of 10 minutes, the carbonate component of the solids entered into solution in the form of calcium silicofluoride. A 98% calcium fluoride was obtained after filtration and washing of the solids. The filtrate and wash water were combined and used for reaction with calcium carbonate in the next batch.

It will be appreciated that the instant specification and examples are set forth by way of illustration and not limitation, and that various modifications and changes may be made without departing from the spirit and scope of the present invention.

What is claimed is:

1. In the production of synthetic fluorspar low in $SiO_2$ wherein aqueous hexafluosilicic acid is reacted with calcium carbonate, and the resulting calcium fluoride is filtered off, the improvement which comprises effecting the reaction by adding the hexafluosilicic acid to an aqueous suspension of the calcium carbonate at a temperature of about 0° to 40°C, there being present during the reaction at least about three times as much water by weight as calcium carbonate, the reaction being carried out in two stages, in the first of which the calcium carbonate suspension is reacted with a stoichiometric excess of hexafluosilicic acid up to a pH of about 2 to 3, followed in the second stage by adjustment of the pH to about 4 to 6 by the addition of calcium carbonate, whereby the $SiO_2$ produced in the reaction is in the form of an aqueous sol from which the fluorspar can readily be separated by filtration.

2. A process as claimed in claim 1, wherein the reaction is carried out at a temperature of about 0° to 30°C.

3. A process as claimed in claim 1, wherein the reaction is carried out continuously in a cascade.

4. A process as claimed in claim 1, wherein the adjustment of the pH in the second stage is effected from about 5 to 30 minutes after bringing the pH to about 2 to 3.

5. A process as claimed in claim 4, wherein the concentration of the starting hexafluosilicic acid is about 5 to 30%, there being present about five to fifteen times as much water by weight as calcium carbonate, and the pH in the second stage being adjusted to about 5.

* * * * *